Nov. 26, 1940.  B. M. GUTHRIE  2,222,662
CONTROL SYSTEM FOR HEATING APPARATUS
Filed March 11, 1938
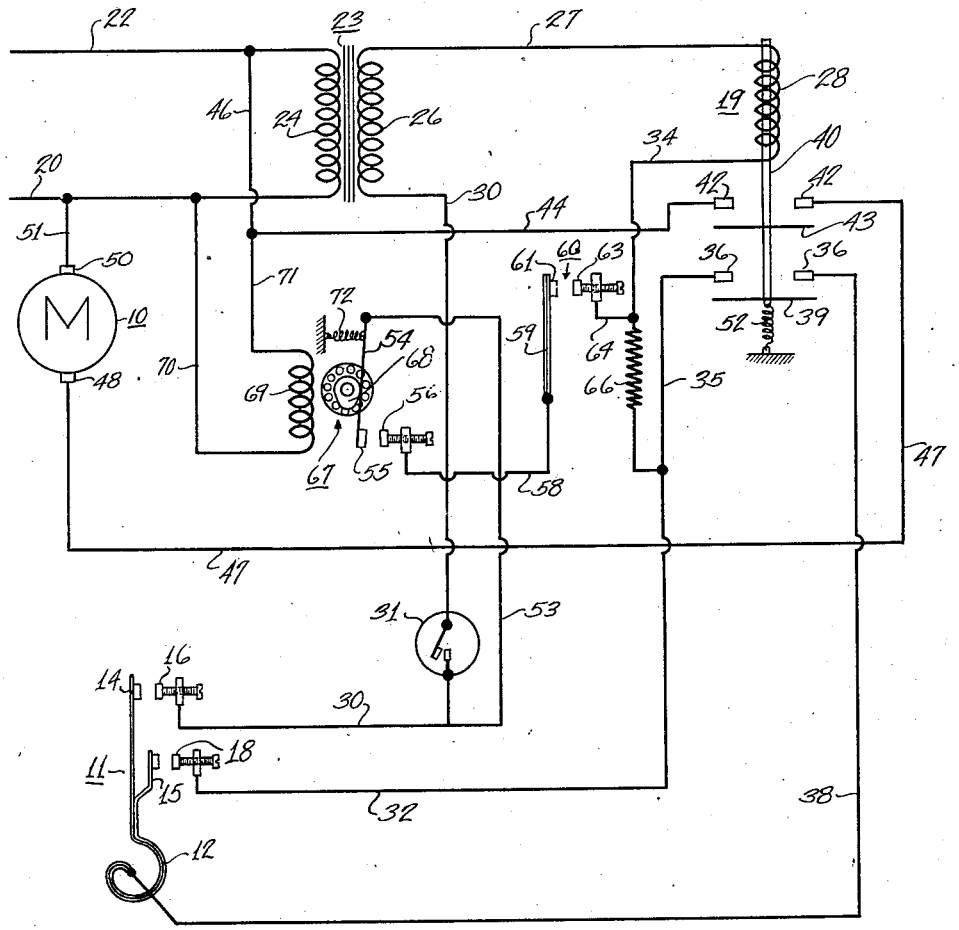
INVENTOR
BERNARD MORSE GUTHRIE
BY
ATTORNEY Patented Nov. 26, 1940

2,222,662

UNITED STATES PATENT OFFICE 2,222,662

CONTROL SYSTEM FOR HEATING APPARATUS

Bernard Morse Guthrie, Chicago, Ill., assignor to Fairbanks, Morse & Co., Chicago, Ill., a corporation of Illinois Application March 11, 1938, Serial No. 195,253

4 Claims. (Cl. 236—46)

This invention relates to an improved control system for heating apparatus and the like, and more particularly to a system for the control of stokers, whereby a stoker may be operated automatically in response to heat demand and also periodically through a time control.

An object of the invention is to provide a completely automatic control system for stokers which will regulate stoker operation in a manner to maintain a substantially uniform desired temperature in the space to be heated.

Another object is found in the provision of an improved and greatly simplified control system for stokers, wherein a space temperature responsive thermostat is utilized as a master control and wherein a time-controlled mechanism provides a secondary or so-called "hold-fire" control, the circuit arrangement including these devices being such that the function of the time-controlled mechanism to initiate stoker operation is dependent upon a control condition of the thermostat.

A further object lies in the provision of a control system for stokers, including a room thermostat, a time operated device serving as a "hold-fire" control, and circuits adapting either to initiate operation of the stoker, the circuit including the time device having therein a thermally operated switch under the control of the room thermostat.

Other objects and advantages will appear from the following description, when read in connection with the accompanying drawing, in which the single figure illustrates diagrammatically, a preferred form of control system embodying improvements and features of the invention.

Referring to the drawing by suitable characters of reference, the system now to be described is adapted particularly for the automatic regulation of fuel stoker apparatus, through control of the operating motor therefor, indicated diagrammatically at 10. A thermostatic switch 11 of suitable type is located in a space to be heated, so as to be subject to temperature variations occuring therein. The thermostat illustrated is, by preference, of a two-contact type, being comprised of a bi-metallic movable thermal element 12 supporting a pair of contact blades 14 and 15 which are engageable respectively, with stationary but adjustable contacts 16 and 18. The arrangement of the thermostat contacting elements is such that upon contact-closing movements of the element 12, the blade 14 will engage its contact 16 prior to engagement between blade 15 and its contact 18. On opening movement of the thermostat, the order or sequence of disengagement of the blades is the reverse, i. e., blade 15 breaks its contact with 18 prior to the break between blade 14 and contact 16. A thermostatic switch functioning as above described is well known and is preferred in the present example of the invention, although a thermostat of single contact or other type could be used without material change in the operating circuit hereinafter to be described.

Thermostat 11 serves as a master control for the stoker motor 10, operating to control the energization of a stoker motor relay switch 19. It is preferred to place the thermostat and relay in a low voltage control circuit which may receive its energy from the main power lines 20 and 22, through a transformer 23 which has its primary winding 24 across the mains. The low voltage control circuit includes the transformer secondary winding 26, a lead 27 connecting one terminal of the winding 26 with one end of the relay operating coil 28, and a lead 30 connecting the opposite terminal of transformer winding 26 with the thermostat contact 16. Included in the lead 30 is a safety limit switch 31 of any suitable type, as a thermostat or pressure operated switch which may be located so as to be responsive to boiler water temperature or pressure in the case of hot water heating systems, or the safety switch may be located in the furnace stack. The purpose of the switch 31 is to effect a break in the control circuit in response to abnormal furnace conditions, whereby to prevent operation of the stoker mechanism until normal furnace operation is restored.

Leads 32 and 34 connect the other thermostat contact 18 to the remaining terminal of the relay coil 28, while a branch lead 35 from lead 32 is connected to one of a pair of stationary contacts 36 on the relay. The other relay contact 36 is connected with the thermostat element 12 through a lead 38. The relay contacts 36 are adapted to be bridged by a contact bar 39 carried by but insulated from a relay actuated armature 40. The lead 35, relay contacts 36, bar 39, lead 38 and thermostat element 12 form a holding circuit for the relay coil 28, as will be hereinafter described.

A pair of main relay contacts 42 are arranged to be bridged by a contact bar 43 carried by the relay armature, but insulated therefrom. One of these contacts is connected by a lead 44 and a lead 46 to the power main 22, while the opposite contact is connected by a lead 47 with a terminal 48 of the stoker motor 10. The other motor terminal 50 is connected directly to power main 20, through a lead 51. Thus from the foregoing, it will be evident that closure of contacts 42 through bar 43, as a result of relay energization, will complete the power circuit for operating the stoker motor. It is to be noted that the relay may be of a gravity opened type, but in the present example, it is preferred to utilize a more positive means such as a spring 52, acting to urge the relay armature 40 in a direction to effect an open circuit of paired contacts 36 and 42 when the relay coil 28 is not energized.

A secondary control circuit for relay 19, arranged in parallel to the circuit controlled by the thermostat is comprised of a branch lead 53 connected to that part of lead 30 extending between the limit switch 31 and the thermostat contact 16, the lead 53 being connected to a movable switch arm 54 supporting a contact element 55. Cooperating with contact 55 is a stationary but adjustable contact 56, which is connected by a lead 58 to a thermally responsive element 59 forming a part of a thermostatic or heat actuated timer switch 60. Element 59 carries a contact 61 which cooperates with a stationary but adjustable contact 63, the latter being connected to lead 34 by a lead 64. Interposed in lead 34 is an electric resistance or heater coil 66 which is arranged adjacent the thermal element 59 so as to effect a movement of the element to break contact between 61 and 63, in response to heating of the coil. The function of this switch in the secondary control circuit will be hereinafter fully described.

Switch arm 54 and the contacts 55—56 comprise the circuit control elements of a time-controlled switch mechanism indicated generally by the numeral 67. The arm 54 is automatically actuated by a cam 68 which is driven by any suitable mechanism, such as a clock motor which includes a field winding 69. The winding 69 is connected directly across the power mains through a lead 70 and a lead 71 connected to lead 46. Thus so long as the power mains are energized, the clock motor will be in operation, and will continuously rotate the cam 68 at a constant speed, say for example, one revolution in every hour, this being attained in a well known manner, as through a reduction gear assembly (not shown). It will be noted that the switch arm 54 is by preference, biased by a suitable spring 72, against the operating surface of cam 68, in order to assure a positive control of switch arm movement by the cam.

The operation of the above described system is such that assuming the power mains 20—22 are energized, a demand for heat in the space to be heated registered on the thermostat 11, as when the space temperature is below the normal desired open-circuit temperature setting of the thermostat, will cause the thermostat element 12 to move to the right of the figure, effecting in sequence contact between blade 14 and its contact 16 and blade 15 with its contact 18. An energizing circuit for relay 19 is thereby completed, this circuit being traced from the transformer secondary 26 through lead 27, relay operating coil 28, lead 34 including heating coil 66, lead 32, thermostat contact 18, thermostat blades 15 and 14, thermostat contact 16 and lead 30 including safety switch 31, back to the transformer secondary. The resulting energization of relay coil 28 operates the relay to close the paired contacts 36 and 42, through the respective bridging elements 39 and 43 on relay armature 40. Closure of contacts 42 completes the power circuit to stoker motor 10, as from main 22 through leads 46 and 44, contacts 42, lead 47 and motor brush 48, motor 10, brush 50 and lead 51 to the opposite main 20. The motor now operates to actuate the stoker mechanism in a manner to effect an increase in heat delivery by the heating apparatus, assuming of course, that normal combustion conditions exist in the furnace, i. e., the fire is not dead or too low for igniting fresh fuel, or the safety switch 31 has not been actuated to open-circuit the control, as a result of abnormal furnace operation to which the safety switch is responsive. As the temperature in the space to be heated rises, resulting from the increase in heat delivery thereto, and approaches the open-circuit temperature setting of the thermostat, the thermostat element 12 will move to the left of the figure, first acting to break contact at 15—18 and then a short time later, at 14—16. The relay 19 does not become deenergized so as to break the motor circuit and stop the stoker apparatus, until thermostat blade 14 disengages its contact 16, for the initial thermostat break at 15—18 has no effect on the relay circuit by reason of the holding circuit completed through relay contacts 36 upon the energization of the relay. The holding circuit may be traced through the circuit elements 26, 27, 28, 34, 35, 36, 39, 38, 12, 14, 16 and 30. By this arrangement, stoker operation is continued during initial opening movement of the thermostatic switch, to assure an adequate heat delivery to the space in accordance with the demand therefor.

The thermostatic switch device 11 comprises the master control for the stoker motor circuit, being responsive for its operation to temperature changes in the space to be heated, and effective in response to space heat demand registered thereupon to initiate stoker operation, independently of the secondary or time-controlled device heretofore described. The function of the time control and its dependency upon the thermostat 11 will be now described.

The time mechanism comprising the motor operated cam 68 and the switch blade 54 actuated thereby, controls an energizing circuit for the relay switch 19, this circuit being in parallel to the thermostatically controlled relay energizing circuit above described. The cam 68 continuously rotated by its motor, periodically actuates arm 54 to close contacts 55 and 56, the cam maintaining these contacts closed for a predetermined period, such period being determined by the speed of the cam and the design of the cam contour or the position of adjustable contact 56 relative to contact 55. As an example, it may be desirable in a given installation of the control system that the stoker be operated once each hour, for a period say of fifteen minutes, in order to maintain combustion in the furnace when there are no calls for heat registered on the thermostat 11. In such instance, the speed of the cam would be set (through the reduction gear mechanism not shown) for one revolution per hour and the contact 56 adjusted relative to contact 55 so that these contacts will remain closed through the operation of cam 68 on arm 54, for a fifteen minute period.

The relay energizing circuit effected by closure of contacts 55—56, may be traced from the transformer secondary 26 through the circuit elements 27, 28, 34, 64, 63, 61, 59, 58, 56, 55, 54, 53, and 30 back to the secondary 26. As a result, the relay will effect a closure of contacts 42 through bridge element 43 on the relay armature, whereby to complete the power circuit to the motor 10.

Operation of the stoker motor thus effected through the instrumentality of the time-controlled switch, will continue for say, fifteen minutes, or until the cam 68 has rotated sufficiently to effect a disengagement of contacts 55—56.

It is to be noted that the relay energizing circuit controlled by the time switch, cannot function to energize the relay unless contacts 61—63 are closed. These contacts are elements of the thermal timer switch 60, which is provided as a means for attaining a time-delay in the operation of the stoker by the time switch 54, for a predetermined time period after a preceding operation of the stoker in response to closure of the room thermostat 11. The function of this time-delay switch is such that when the relay 19 is energized by closure of the circuit through the thermostat 11, the current traversing lead 34 and resistance coil 66, causes the coil to heat up and the heat therefrom affects the thermal element 59, warping the element in a direction to break the engagement between contacts 61—63. So long as these contacts are open, the time control cannot effect energization of the relay 19. However, after the thermostat 11 is satisfied and has returned to circuit-open position, thereby de-energizing the relay 19 and the heater coil 66, the thermal element 59 will cool and hence move its contact 61 toward the stationary contact 63 to effect engagement therebetween. The time required for the element 59 to cool sufficiently to effect closure of contacts 61—63 may be regulated through the adjustable contact 63, as by varying the position of contact 63 relative to the thermal element 59 and its contact 61, when the thermal element is in its extreme "hot" position effected by heating of coil 66. It is to be noted also that the period of open-circuit condition of time switch 60, when the switch is once adjusted as above indicated, is directly affected by the period of thermostat closure, which period may vary considerably according to the degree of heat demand in the space to be heated. For example, the thermostat may close to initiate stoker operation when the space temperature drops only slightly below the desired temperature, in which case the thermostat will remain closed only until the desired temperature is restored, say only a few minutes. Depending upon the heat characteristics of the time switch heater coil 66, the time switch thermal element 59 may not be warped to the full extent of which it is capable, during the few minutes the thermostat remains closed, as in the above example. In other instances, the thermostat may remain closed for a longer period of time, during which the heater coil 66 may effect a full warping of the element 59. Thus the open-circuit period of switch 60 becomes a variable which is dependent upon the length of time the thermostat remains closed in response to heat demand by the space.

From the above described function of the time-delay switch, it will be evident that by this device, the secondary control comprising the time switch 67 is rendered ineffective to cause energization of relay 19 for a predetermined period of time measured from the cessation of current flow through the heater coil 66. As current flow through coil 66 is effected only by closure of the master control thermostat 11 in response to heat demand of the space, the operative condition of the time-delay switch 60 is dependent upon the operative condition of the thermostat. However, so long as the thermostat remains open and the switch 60 closed, the time switch 67 may function to effect periodic operation of the stoker motor and hence of the stoker mechanism, to maintain desired combustion conditions in the furnace. By this control, fresh fuel may be delivered to the furnace periodically and in an amount sufficient to maintain at least the minimum fuel combustion in the furnace, so as to prevent the fire from becoming extinguished during those periods in which there is no call registered on the thermostat, for an increase in heat delivery to the space to be heated.

As will be evident now, the thermal switch 60 serves to effect a time-delay in the control function of the timing mechanism to initiate stoker operation, the time-delay period in each instance beginning from the opening of the thermostat switch 11 after closure thereof in response to a call for heat by the space. To continue stoker operation by the time-controlled mechanism, immediately after thermostat 11 has moved to open-circuit position, indicating that the temperature in the space has attained at least the normal desired value, would effect an undesirable increase in the space temperature, as well as an unnecessary delivery of fresh fuel to the retort. Accordingly, the open circuit condition at switch 60 when the thermostat 11 becomes thermally satisfied and opens its contacts, effectively prevents for a predetermined time interval, further stoker operation by the timing mechanism, should the cam 68 operate during such interval, to close the contacts 55—56. Thus the switch 60 being under direct control by the room thermostat 11, renders the parallel stoker operating circuit including the time-controlled switch mechanism 67, dependent for its operation, upon the operative condition of the thermostat 11.

It is to be noted from the foregoing description of the parallel relay energizing circuits, that the limit switch 31 is in series with each of such circuits and with one side of the transformer secondary 26. Hence the limit switch acting in response to abnormal furnace conditions, may operate to open-circuit both energizing circuits, so that neither the thermostatic switch 11 nor the time-controlled switch 67 can function to effect energization of the relay 19. Thus switch 31 serves as a safety control, operative to prevent stoker operation under abnormal furnace conditions, until such time as normal furnace conditions are restored.

The stoker control system above described, fully attains the foregoing objects and others readily appearing from the disclosure. Moreover, the system is fully automatic in its operation to maintain substantially uniform, a desired temperature condition in a space to be heated. Although but a single diagrammatic embodiment of the invention has been shown and described, it is to be understood that the elements of the system, such as the thermostat, relay and clock-motor-operated time switch, may be of any well known and readily available type, suitable to the purpose set forth herein. Also, the circuit arrangement of these elements may be altered or modified within the scope of the invention, as defined by the appended claims.

I claim:

1. In a heat control system for a space to be heated, a thermostatic switch responsive to temperatures in said space, comprising a movable member and two contacts engageable thereby, a time-controlled switch, a relay having a holding contact, a relay energizing circuit including therein said thermostatic switch and said relay, a holding circuit including said thermostatic switch, said holding contact and relay, a parallel relay energizing circuit including therein said time-controlled switch, a second thermostatic switch and said relay, and means in said first relay energizing circuit controlled by the first said thermostatic switch, adapted for influencing operation of said second thermostatic switch.

2. In a heat control system for a space to be heated, a thermostatic switch responsive to temperatures in said space, comprising a movable member and two contacts sequentially engageable thereby, a time-controlled switch, a relay having a holding contact, a first relay energizing circuit including therein said relay and the movable member and both contacts of said thermostatic switch, a holding circuit including the movable member and one of the contacts of said thermostatic switch, said holding contact and the relay, a second relay energizing circuit including therein said time-controlled switch, a second thermostatic switch and said relay, and means in said first relay energizing circuit controlled by the first said thermostatic switch, adapted for influencing operation of said second thermostatic switch.

3. In a heat control system for a space to be heated, a thermostatic switch responsive to temperatures in said space, a time-controlled switch, a relay having a holding contact, a relay energizing circuit including therein said thermostatic switch and said relay, a holding circuit including said thermostatic switch, said holding contact and relay, a parallel relay energizing circuit including therein said time-controlled switch, a heat-actuated switch and said relay, and an electric heating element for said heat-actuated switch, said heating element being in circuit with the first said relay energizing circuit and said holding circuit.

4. In a heat control system for a space to be heated, means for producing heat including a relay adapted when energized to initiate heat production, a thermostatic switch responsive to temperatures in said space, an electrical heater element, a relay energizing circuit including said thermostatic switch and electrical heater element in series therein, a continuously operated time-controlled switch, a heat actuated switch, and a second relay energizing circuit including said time-controlled switch and heat actuated switch in series therein, said electrical heater element being located in controlling relation to said heat actuated switch and serving when energized in response to circuit-closure of said thermostatic switch, to effect an open-circuit condition of said heat actuated switch, thereby to render said time-controlled switch ineffective to cause energization of said relay, and said heat actuated switch being adapted to maintain the open circuit condition thereof, for a predetermined time-interval as measured from the deenergization of said electrical heater element in response to circuit-opening of the thermostatic switch, whereby there is effected, following each operation of the heat producing means in response to circuit-closure of the room thermostat, a delay in the circuit-closure of the heat actuated switch to render the time-controlled switch effective for producing periodic operation of the heat producing means.

BERNARD MORSE GUTHRIE.